(12) United States Patent
Weng et al.

(10) Patent No.: US 6,660,809 B1
(45) Date of Patent: Dec. 9, 2003

(54) PROPYLENE POLYMERS INCORPORATING POLYETHYLENE MACROMERS

(75) Inventors: Weiqing Weng, Houston, TX (US); Armen Dekmezian, Kingwood, TX (US); Eric J. Markel, Kingwood, TX (US); Avinash Gadkari, Houston, TX (US); Jean-Marc Dekoninck, Beauvechain (BE)

(73) Assignee: ExxonMobil Chemical Patents Inc.

( * ) Notice: Subject to any disclaimer, the term of this patent is extended or adjusted under 35 U.S.C. 154(b) by 0 days.

(21) Appl. No.: 09/020,307

(22) Filed: Feb. 6, 1998

Related U.S. Application Data
(60) Provisional application No. 60/037,323, filed on Feb. 7, 1997, provisional application No. 60/046,812, filed on May 2, 1997, and provisional application No. 60/067,782, filed on Dec. 10, 1997.

(51) Int. Cl.$^7$ .................. C08F 255/00; C08F 255/04
(52) U.S. Cl. .................. 525/245; 525/247; 526/160; 526/165; 526/134; 526/348.3
(58) Field of Search .................. 526/346, 348, 526/348.2, 348.3; 525/245, 247

(56) References Cited

U.S. PATENT DOCUMENTS

| | | | |
|---|---|---|---|
| 4,530,914 A | 7/1985 | Ewen et al. | 502/113 |
| 4,542,199 A | 9/1985 | Kaminsky et al. | 526/160 |
| 4,543,399 A | 9/1985 | Jenkins, III et al. | 526/70 |
| 4,588,790 A | 5/1986 | Jenkins, III et al. | 526/70 |
| 4,665,208 A | 5/1987 | Welborn, Jr. et al. | 556/179 |
| 4,701,432 A | 10/1987 | Welborn, Jr. | 502/113 |
| 4,769,910 A | 9/1988 | Noon | 30/91.2 |
| 4,808,561 A | 2/1989 | Welborn, Jr. | 502/104 |
| 4,871,705 A | 10/1989 | Hoel | 502/117 |
| 4,874,734 A | 10/1989 | Kioka et al. | 502/104 |
| 4,892,851 A | 1/1990 | Ewen et al. | 502/104 |
| 4,908,463 A | 3/1990 | Bottelberghe | 556/179 |
| 4,921,825 A | 5/1990 | Kioka et al. | 502/104 |
| 4,923,833 A | 5/1990 | Kioka et al. | 502/9 |
| 4,924,018 A | 5/1990 | Bottelberghe | 556/179 |
| 4,933,403 A | 6/1990 | Kaminsky et al. | 526/160 |
| 4,937,299 A | 6/1990 | Ewen et al. | 526/119 |
| 4,952,540 A | 8/1990 | Kioka et al. | 502/9 |
| 4,968,827 A | 11/1990 | Davis | 556/179 |
| 5,017,714 A | 5/1991 | Welborn, Jr. | 556/12 |
| 5,028,670 A | 7/1991 | Chinh et al. | 526/73 |
| 5,057,475 A | 10/1991 | Canich et al. | 502/104 |
| 5,091,352 A | 2/1992 | Kioka et al. | 502/103 |
| 5,103,031 A | 4/1992 | Smith, Jr. | 556/179 |
| 5,120,867 A | 6/1992 | Welborn, Jr. | 556/12 |
| 5,132,381 A | 7/1992 | Winter et al. | 526/160 |
| 5,149,819 A | 9/1992 | Satoh et al. | 548/149 |
| 5,155,080 A | 10/1992 | Elder et al. | 502/152 |
| 5,157,137 A | 10/1992 | Sangokoya | 556/179 |
| 5,198,401 A | 3/1993 | Turner et al. | 502/155 |
| 5,204,419 A | 4/1993 | Tsutsui et al. | 526/153 |
| 5,206,199 A | 4/1993 | Kioka et al. | 502/117 |
| 5,235,081 A | 8/1993 | Sangokoya | 556/179 |
| 5,239,022 A | 8/1993 | Winter et al. | 526/127 |
| 5,240,894 A | 8/1993 | Burkhardt et al. | 502/108 |
| 5,243,001 A | 9/1993 | Winter et al. | 526/127 |
| 5,248,801 A | 9/1993 | Sangokoya | 556/179 |
| 5,276,208 A | 1/1994 | Winter et al. | 556/53 |
| 5,278,119 A | 1/1994 | Turner et al. | 502/155 |
| 5,296,434 A | 3/1994 | Karl et al. | 502/117 |
| 5,304,614 A | 4/1994 | Winter et al. | 526/127 |
| 5,308,815 A | 5/1994 | Sangokoya | 502/104 |
| 5,318,935 A | 6/1994 | Canich et al. | 502/117 |
| 5,324,800 A | 6/1994 | Welborn, Jr. et al. | 526/160 |
| 5,329,032 A | 7/1994 | Tran et al. | 556/179 |
| 5,350,723 A | 9/1994 | Neithanier et al. | 4/57 |
| 5,352,749 A | 10/1994 | DeChellis et al. | 526/68 |
| 5,382,630 A | 1/1995 | Stehling et al. | 525/240 |
| 5,391,790 A | 2/1995 | Rohrmann et al. | 556/28 |
| 5,405,922 A | 4/1995 | DeChellis et al. | 526/68 |
| 5,436,304 A | 7/1995 | Griffin et al. | 526/68 |
| 5,498,809 A | 3/1996 | Emert et al. | 585/13 |
| 5,514,761 A | 5/1996 | Etherton et al. | 526/144 |
| 5,541,236 A | 7/1996 | DeNicola, Jr. et al. | 522/157 |
| 5,635,573 A | 6/1997 | Harrington et al. | 526/170 |
| 5,643,847 A | 7/1997 | Walzer, Jr. | 502/117 |
| 5,955,557 A * | 9/1999 | Machida et al. | 526/346 |

FOREIGN PATENT DOCUMENTS

| | | |
|---|---|---|
| EP | 0 277 003 A1 | 1/1987 |
| EP | 0 277 004 A1 | 8/1988 |
| EP | 0 366 411 A | 5/1990 |
| EP | 0 500 944 A1 | 2/1992 |
| EP | 0 495 375 A2 | 7/1992 |

(List continued on next page.)

OTHER PUBLICATIONS

Journal of Organometallic Chemistry, vol. 288, (1958), p. 63–67.

Soares et al., *Semicrystalline Polyolefins –Narrow MWD and Long Chain Branching: Best of Both Worlds*, Antec, pp. 2334–2337, 1996.

Primary Examiner—Caixia Lu (57) ABSTRACT

A polyolefin product is provided which comprises a branched olefin copolymer having an isotactic polypropylene backbone, polyethylene branches and, optionally, one or more comonomers. The total comonomer content of the branched olefin copolymer is from 0 to 20 mole percent. Also, the mass ratio of the isotactic polypropylene to the polyethylene ranges from 99.9:0.1 to 50:50. Additionally, a process is provided for preparing a branched olefin copolymer which comprises:

a) copolymerizing ethylene, optionally with one or more copolymerizable monomers, in a polymerization reaction under conditions sufficient to form copolymer having greater than 40% chain end-group unsaturation;

b) copolymerizing the product of a) with propylene and, optionally, one or more copolymerizable monomers, in a polymerization reactor under suitable polypropylene polymerization conditions using a chiral, stereorigid transition metal catalyst capable of producing isotactic polypropylene; and c) recovering a branched olefin copolymer.

67 Claims, 2 Drawing Sheets

FOREIGN PATENT DOCUMENTS

| | | |
|---|---|---|
| EP | 0 279 863 B1 | 10/1992 |
| EP | 0 520 732 A1 | 12/1992 |
| EP | 0 190 889 B1 | 4/1993 |
| EP | 0 561 476 A1 | 9/1993 |
| EP | 0 570 982 A1 | 11/1993 |
| EP | 0 573 403 A2 | 12/1993 |
| EP | 0 573 403 | 12/1993 |
| EP | 0 594 218 A1 | 4/1994 |
| EP | 0 279 586 B1 | 5/1994 |
| EP | 0 354 893 B1 | 11/1994 |
| EP | 0 384 431 B1 | 11/1994 |
| EP | 0 667 359 A | 8/1995 |
| EP | 0 320 762 B1 | 3/1996 |
| EP | 0 727 446 A | 8/1996 |
| JP | 04 337308 A | 10/1992 |
| WO | WO 91/09882 | 7/1991 |
| WO | WO 92/00333 | 1/1992 |
| WO | WO 93/21242 | 10/1993 |
| WO | WO 94/03506 | 2/1994 |
| WO | WO 94/07928 | 4/1994 |
| WO | WO 94/07930 | 4/1994 |
| WO | WO 94/10180 | 5/1994 |
| WO | WO 94/13715 | 6/1994 |
| WO | WO 94/19436 | 9/1994 |
| WO | WO 94/28034 | 12/1994 |
| WO | WO 96/00243 | 1/1996 |
| WO | WO 96/00245 | 1/1996 |
| WO | WO 96/04319 | 2/1996 |
| WO | WO 96/23010 | 8/1996 |

* cited by examiner

PROPYLENE POLYMERS INCORPORATING POLYETHYLENE MACROMERS

This application is based on U.S. provisional applications No. 60/037323, filed Feb. 2, 1997, No. 60/046812, filed May 2, 1997, and No. 60/067782, filed Dec. 10, 1997.

FIELD OF THE INVENTION

The present invention relates to propylene polymers incorporating macromers and a method for the preparation of branched polypropylene utilizing chiral, stereorigid transition metal catalyst compounds.

BACKGROUND OF THE INVENTION

Polypropylene and related polymers are known to have low melt strength. This is a significant deficiency in key application areas such as thermoforming, blow molding, and fiber spinning. Polyethylene on the other hand is used extensively in blown film applications requiring good melt strength. The limitations in the melt strength of polypropylenes show up as excess sag in sheet extrusion, rapid thinning of walls in parts thermoformed in the melt phase, low draw-down ratios in extrusion coating, poor bubble formation in extrusion foam materials, and relative weakness in large-part blow molding. Thus, it would be highly desirable to produce polypropylene and related polymers having enhanced melt strength as well as commercially valuable processability.

Increasing the melt strength of polymers such as polypropylene has been an industrial goal for well over ten years, however, success has been limited. The desirable properties that have made low density polyethylene commercially successful are attributed in large part to high melt strength and excellent processability. Both of these properties are attributed to the presence of long chain branching which is thought to occur under high pressure polymerization conditions.

There has been some success in increasing the melt strength of polypropylene. For example, EP 190 889 A2 discloses high energy irradiation of polypropylene to create what is believed to be polypropylene having substantial free-end long branches of propylene units. EP 384 431 discloses the use of peroxide decomposition of polypropylene in the substantial absence of oxygen to obtain a similar product.

Other attempts to improve the melt properties of polypropylene include U.S. Pat. No. 5,541,236, which introduces long chain branching by bridging two PP backbones to form H-type polymers, and U.S. Pat. No. 5,514,761, which uses dienes incorporated in the backbones to achieve a similar effect. However, it is difficult to avoid cross-linking and gel formation in such processes.

Thus, there is still a need for propylene polymers having improved melt strength and good processability.

SUMMARY OF THE INVENTION

The present invention meets that need by providing a polyolefin product which comprises a branched olefin copolymer having an isotactic polypropylene backbone, polyethylene branches and, optionally, one or more comonomers. The total comonomer content of the branched olefin copolymer is from 0 to 20 mole percent. Also, the mass ratio of the isotactic polypropylene to the polyethylene ranges from 99.9:0.1 to 50:50. Additionally, a process is provided for preparing a branched olefin copolymer which comprises:

a) copolymerizing ethylene, optionally with one or more copolymerizable monomers, in a polymerization reaction under conditions sufficient to form copolymer having greater than 40% chain end-group unsaturation;

b) copolymerizing the product of a) with propylene and, optionally, one or more copolymerizable monomers, in a polymerization reactor under suitable polypropylene polymerization conditions using a chiral, stereorigid transition metal catalyst capable of producing isotactic polypropylene; and c) recovering a branched olefin copolymer.

One invention embodiment relates to a polyolefin product comprising a branched olefin copolymer having an isotactic polypropylene backbone, optionally comprising mer units from one or more comonomers, and sidechains. These side chains are derived from macromers which have vinyl ends and are olefin copolymer chains having a number average molecular weight ($M_n$) of about 1500 to 25,154, the number average molecular weight being determined by gel permeation chromatography (GPC) at 145° C. Additionally, the ratio of vinyl groups to total olefin groups in these side chains follows the formula: (vinyl groups/olefin groups)$\geq$ (comonomer mole percentage+0.1)$^a \times 10^a \times$b. a and b take the following sets of values: a =−0.24, b=0.8; a=−0.20, b=0.8; a=−0.18, b=0.83; a=−0.15, b=0.83; or a=−0.10, b=0.85. The total number of vinyl groups per 1000 carbon atoms is greater than or equal to 8000÷$M_n$ in these macromers. The number of vinyl groups is determined by $^1$H-NMR at 125° C. $M_w/M_n$ ranges from 2.083 to 5.666.

Another invention embodiment relates to a polyolefin product comprising a branched olefin copolymer having an isotactic polypropylene backbone, optionally comprising mer units from one or more comonomers, and sidechains. These side chains are derived from macromers which have vinyl ends and are olefin copolymer chains having a number average molecular weight ($M_n$) of about 1500 to 75,000, the number average molecular weight being determined by gel permeation chromatography (GPC) at 145° C. Additionally, the ratio of vinyl groups to total olefin groups in these side chains follows the formula: (vinyl groups/olefin groups)$\geq$ (comonomer mole percentage +0.1)$^a \times 10^a \times$b. a and b take the following sets of values: a=−0.24, b=0.8; a=−0.20, b=0.8; a=−0.18, b=0.83; a=−0.15, b=0.83; or a=−0.10, b=0.85. The total number of vinyl groups per 1000 carbon atoms is greater than or equal to 8000÷$M_n$ in these macromers. The number of vinyl groups is determined by $^1$H-NMR at 125° C. $M_w/M_n$ ranges from 2.083 to 5.666. Finally, the vinyl ended olefin copolymer chains are prepared from ethylene and at least one monomer selected from $C_3$ to $C_{12}$ α-olefins.

DETAILED DESCRIPTION OF THE INVENTION

The polyolefin compositions of this invention are comprised of branched polymers wherein the polymer backbone is derived from propylene and the polymer branches are derived from polyethylene. The branches and backbone are polymerized under coordination or insertion conditions with activated transition metal organometallic catalyst compounds. The branches are composed of polyethylene which may exhibit crystalline, semi-crystalline or glassy properties suitable for hard phase domains in accordance with the art understood meaning of those terms, and are attached to a polymeric backbone that may also be crystalline. The backbone is composed of stereospecific polypropylene and, optionally, one or more comonomers. In addition, the backbone has a melt point of 80° C. or higher. Preferably, the backbone is isotactic polypropylene. These compositions are useful as thermoforming resins and exhibit improved processability over current polypropylene compositions.

In the branched olefin copolymer of the present invention, the mass ratio of the isotactic polypropylene to the polyethylene ranges from 99.9:0.1 to 50:50. Preferably, the mass ratio of the isotactic polypropylene to the polyethylene ranges from 95:5 to 50:50.

As used herein, "isotactic polypropylene" is defined as having at least 70% isotactic pentads according to analysis by $^{13}$C-NMR. "Highly isotactic polypropylene" is defined as having at least 90% isotactic pentads according to analysis by $^{13}$C-NMR. "Syndiotactic polypropylene" is defined as polypropylene having at least 70% syndiotactic pentads according to analysis by $^{13}$C-NMR. Preferably, the backbone of the present invention is highly isotactic polypropylene.

The Macromer Sidechains

The branches of the polymer (also referred to as "sidechains") are comprised ethylene and, optionally, one or more comonomers. Preferably, the comonomers are chemical units capable of forming crystalline or glassy polymeric segments under conditions of insertion polymerization. Suitable comonomers include $C_3$–$C_{20}$ α-olefins, geminally disubstituted monomers, $C_5$–$C_{25}$ cyclic olefins, $C_8$–$C_{25}$ styrenic olefins and lower carbon number ($C_3$–$C_8$) alkyl-substituted analogs of the cyclic and styrenic olefins. Thus, typically, the branches can comprise from 85–100 mol % ethylene, and from 0–15 mol % comonomer, preferably 90–99 mol % ethylene and 1–10 mol % comonomer, most preferably 94–98 mol % ethylene and 2–6 mol % comonomer. In particular, as the sidechain Mn increases above about 3,000, it is preferable to introduce small amounts of comonomer to minimize embrittlement, e.g., about 0.2–4.0 mol % comonomer. The selection of comonomer can be based upon properties other than crystallinity disrupting capability, for instance, a longer olefin comonomer, such as 1-octene, may be preferred over a shorter olefin such as 1-butene for improved polyethylene film tear. For improved polyethylene film elasticity or barrier properties, a cyclic comonomer such as norbornene or alkyl-substituted norbornene maybe preferred over an α-olefin.

The sidechains can have narrow or broad molecular weight distribution (Mw/Mn), for example, from 1.1 to 30, typically 2–8. Additionally, the sidechains can have different comonomer compositions, e.g., including the orthogonal compositional distributions described in U.S. Pat. No. 5,382,630 (CDBI >50%), incorporated by reference for purposes of U.S. patent practice. Optionally, mixtures of sidechains with different molecular weights and/or compositions may be used.

The $M_n$ of the sidechains are within the range of from greater than or equal to 500 and less than or equal to 45,000. Preferably the $M_n$ of the sidechains is from 1500 to 30,000, and more preferably the $M_n$ is from 1500 to 25,000. A preferred branched olefinic copolymer within this class will have a melt enthalpy ($\Delta H_m$) as measured by differential scanning calorimetry of $\leq$90 cal/g (measured by integrating heat flows recorded at temperatures $\geq$80° C. while scanning at $\geq$5° C./min).

Conditions sufficient to form the sidechain copolymer include using suitable ethylene and comonomer reactant ratios to assure the described sidechain olefin-derived unit constitution, plus catalyst and process conditions conducive to forming the unsaturated chain ends. The teachings of copending provisional application U.S. Ser. No. 60/037323 filed Feb. 7, 1997 are specific to suitable catalyst selection and use to prepare macromeric copolymer chains with a high yield of vinyl unsaturation. The metallocene catalyst used in the step a) preparation of the unsaturation-containing macromer can be essentially any catalyst capable of insertion polymerization of ethylene, it can be one capable of high comonomer incorporation capability (see below) or of low comonomer incorporation capability. Those of low incorporation capability are typically those that are more congested at the metal coordination site, thus unbridged and substituted unbridged metallocene catalysts are particularly suitable. See also the teachings of U.S. Pat. No. 5,498,809 and international publications WO 94/19436 and WO 94/13715, describing means of preparing vinylidene-terminated ethylene-1-butene copolymers in high yields. See also, the teachings of copending application U.S. Ser. No. 08/651,030, filed May 21, 1996, as to the preparation of ethylene-isobutylene copolymers having high levels of vinylidene chain-end unsaturation. Throughout the description above, and below, the phrase "chain-end" or "terminal" when referring to unsaturation means olefin unsaturation suitable for insertion polymerization whether or not located precisely at the terminus of a chain. All documents of this paragraph are incorporated by reference for purposes of U.S. patent practice.

In a particular embodiment, polymeric unsaturation-containing macromer product suitable as branches for a subsequent copolymerization reaction can be prepared under solution polymerization conditions with preferred molar ratios of aluminum in the alkyl alumoxane activator, e.g., methyl alumoxane (MAO), to transition metal. Preferably that level is $\geq$20 and =175; more preferably $\geq$20 and =140; and, most preferably $\geq$20 and =100. The temperature, pressure and time of reaction depend upon the selected process but are generally within the normal ranges for a solution process. Thus temperatures can range from 20° C. to 200° C., preferably from 30° C. to 150° C., more preferably from 50° C to 140° C., and most preferably between 55° C. and 135° C. The pressures of the reaction generally can vary from atmospheric to 345 MPa, preferably to 182 MPa. For typical solution reactions, temperatures will typically range from ambient to 250° C. with pressures from ambient to 3.45 MPa. The reactions can be run batchwise. Conditions for suitable slurry-type reactions are similar to solution conditions except reaction temperatures are limited to those below the melt temperature of the polymer. In an additional, alternative reaction configuration, a supercritical fluid medium can be used with temperatures up to 250° C. and pressures up to 345 MPa. Under high temperature and pressure reaction conditions, macromer product of lower molecular weight ranges are typically produced, e.g., $M_n$ about 1,500.

Suitable catalyst compounds that when activated can achieve high chain-end unsaturations specifically include those identified above with respect to the preparation of high vinyl or vinylidene-containing macromers. Catalyst compounds which are suitable for preparing the branched olefin copolymer of the present invention are discussed in more detailed below.

The polypropylene macromers can have narrow or broad molecular weight distribution (Mw/Mn), for example, from 1.5 to 5, typically 1.7 to 3. Optionally, mixtures of sidechains with different molecular weights may be used.

Preferably, the macromers of the present invention are made using solution-phase conditions. Preferred solvents for solution phase reactions are selected on the basis of polymer solubility, volatility and safety/health considerations. Non-polar alkanes or aromatics are preferred.

The Polyolefin Backbone

The polyolefin backbone of the present invention is composed of propylene monomers and, optionally, one or more comonomers. In one embodiment of the present invention, no comonomers are present in the polyolefin backbone, resulting in a polymer having an isotactic polypropylene backbone and polyethylene sidechains.

In another embodiment of the present invention, one or more comonomers are present in the backbone. Comonomers which are useful in the present invention include ethylene, $C_4$–$C_{20}$ α-olefins, and lower carbon number ($C_3$–$C_8$) alkyl substituted analogs of the cyclic and styrenic olefins. Other copolymerizable monomers include geminally disubstituted olefins such as isobutylene, $C_5$–$C_{25}$ cyclic olefins such as cyclopentene, norbornene and alkyl-substituted norbornenes, and styrenic monomers such as styrene and alkyl substituted styrenes. Comonomers are selected for use based on the desired properties of the polymer product and the metallocene employed will be selected for its ability to incorporate the desired amount of olefins.

When comonomers are used, they preferably comprise from 3 to 20 mole percent of the branched olefin copolymer. More preferably, the comonomers comprise from 5 to 17 mole percent of the branched olefin copolymer.

In another embodiment of the present invention, the backbone of the present invention contains syndiotactic polypropylene and, optionally, one or more comonomers. Essentially all of the backbone can be syndiotactic, resulting in a polymer having a syndiotactic polypropylene backbone and polyethylene sidechains. Alternatively, the backbone can be a combination of syndiotactic and isotactic polypropylene with, optionally, one or more comonomers.

The mass of the backbone will typically comprise at least 40 wt % of the total polymer mass, that of the backbone and the sidechains together, so the backbone typically will have a nominal weight-average molecular weight ($M_w$) weight of at least equal to or greater than about 60,000. The term nominal is used to indicate that direct measurement of $M_w$ of the backbone is largely impossible but that characterization of the copolymer product will exhibit measurements of $M_w$ that correlate to a close approximate weight of the polymeric backbone inclusive only of the monoolefin mer derivatives and the insertion moieties of the sidebranches when the macromer consists of less than 50% of the total polymer mass.

Catalysts

Catalysts which are useful for producing the branched polyolefin of the present invention include all catalysts which are capable of producing isotactic polypropylene and incorporating significant quantities of the isotactic polyethylene macromers of the present invention. Preferably, metallocene catalysts are used.

As used herein "metallocene" refers generally to compounds represented by the formula $Cp_mMR_nX_q$ wherein Cp is a cyclopentadienyl ring which may be substituted, or derivative thereof which may be substituted, M is a Group 4, 5, or 6 transition metal, for example titanium, zirconium, hafnium, vanadium, niobium, tantalum, chromium, molybdenum and tungsten, R is a hydrocarbyl group or hydrocarboxy group having from one to 20 carbon atoms, X is a halogen, and m=1–3, n=0–3, q=0–3, and the sum of m+n+q is equal to the oxidation state of the transition metal.

Methods for making and using metallocenes are well known in the art. For example, metallocenes are detailed in U.S. Pat. Nos. 4,530,914; 4,542,199; 4,769,910; 4,808,561; 4,871,705; 4,933,403; 4,937,299; 5,017,714; 5,057,475; 5,120,867; 5,278,119; 5,304,614; 5,324,800; 5,350,723; 5,391,790; and 5,635,573 each fully incorporated herein by reference.

Preferred metallocenes are those that are stereorigid and comprise a Group 4, 5, or 6 transition metal, biscyclopentadienyl derivative, preferably bis-indenyl metallocene components having the following general structure:

wherein

$M^1$ is a metal of Group 4, 5, or 6 of the Periodic Table, for example titanium, zirconium, hafnium, vanadium, niobium, tantalum, chromium, molybdenum and tungsten, preferably, zirconium, hafnium and titanium, most preferably zirconium and hafnium;

$R^1$ and $R^2$ are identical or different, are one of a hydrogen atom, a $C_1$–$C_{10}$ alkyl group, preferably a $C_1$–$C_3$ alkyl group, a $C_1$–$C_{10}$ alkoxy group, preferably a $C_1$–$C_3$ alkoxy group, a $C_6$–$C_{10}$ aryl group, preferably a $C_6$–$C_8$ aryl group, a $C_6$–$C_{10}$ aryloxy group, preferably a $C_6$–$C_8$ aryloxy group, a $C_2$–$C_{10}$ alkenyl group, preferably a $C_2$–$C_4$ alkenyl group, a $C_7$–$C_{40}$ arylalkyl group, preferably a $C_7$–$C_{10}$ arylalkyl group, a $C_7$–$C_{40}$ alkylaryl group, preferably a $C_7$–$C_{12}$ alkylaryl group, a $C_8$–$C_{40}$ arylalkenyl group, preferably a $C_8$–$C_{12}$ arylalkenyl group, or a halogen atom, preferably chlorine;

$R^3$ and $R^4$ are hydrogen atoms;

$R^5$ and $R^6$ are identical or different, preferably identical, are one of a hydrogen atom, halogen atom, preferably a fluorine, chlorine or bromine atom, a $C_1$–$C_{10}$ alkyl group, preferably a $C_1$–$C_4$ alkyl group, which may be halogenated, a $C_6$–$C_{10}$ aryl group, which may be halogenated, preferably a $C_6$–$C_8$ aryl group, a $C_2$–$C_{10}$ alkenyl group, preferably a $C_2$–$C_4$ alkenyl group, a $C_7$–$C_{40}$-arylalkyl group, preferably a $C_7$–$C_{10}$ arylalkyl group, a $C_7$–$C_{40}$ alkylaryl group, preferably a $C_7$–$C_{12}$ alkylaryl group, a $C_8$–$C_{40}$ arylalkenyl group, preferably a $C_8$–$C_{12}$ arylalkenyl group, a —$NR_2^{15}$, —$SR^{15}$, —$OR^{15}$, —$OSiR_3^{15}$ or —$PR_2^{15}$ radical, wherein $R^{15}$ is one of a halogen atom, preferably a chlorine atom, a $C_1$–$C_{10}$ alkyl group, preferably a $C_1$–$C_3$ alkyl group, or a $C_6$–$C_{10}$ aryl group, preferably a $C_6$—$C_9$ aryl group;

$R^7$ is

=BR$^{11}$,=AlR$^{11}$, —Ge—, —Sn—, —O—, —S—,
=SO, =SO$_2$, =NR$^{11}$, =CO, PR$^{11}$, or =P(O)R$^{11}$;

wherein:

$R^{11}$, $R^{12}$ and $R^{13}$ are identical or different and are a hydrogen atom, a halogen atom, a $C_1$–$C_{20}$ alkyl group, preferably a $C_1$–$C_{10}$ alkyl group, a $C_1$–$C_{20}$ fluoroalkyl group, preferably a $C_1$–$C_{10}$ fluoroalkyl group, a $C_6$–$C_{30}$ aryl group, preferably a $C_6$–$C_{20}$ aryl group, a $C_6$–$C_{30}$ fluoroaryl group, preferably a $C_6$–$C_{20}$ fluoroaryl group, a $C_1$–$C_{20}$ alkoxy group, preferably a $C_1$–$C_{10}$ alkoxy group, a $C_2$–$C_{20}$ alkenyl group, preferably a $C_2$–$C_{10}$ alkenyl group, a $C_7$–$C_{40}$ arylalkyl group, preferably a $C_7$–$C_{20}$ arylalkyl group, a $C_8$–$C_{40}$ arylalkenyl group, preferably a $C_8$–$C_{22}$ arylalkenyl group, a $C_7$–$C_{40}$ alkylaryl group, preferably a $C_7$–$C_{20}$ alkylaryl group or $R^{11}$ and $R^{12}$, or $R^{11}$ and $R^{13}$, together with the atoms binding them, can form ring systems;

$M^2$ is silicon, germanium or tin, preferably silicon or germanium, most preferably silicon;

$R^8$ and $R^9$ are identical or different and have the meanings stated for $R^{11}$;

m and n are identical or different and are zero, 1 or 2, preferably zero or 1, m plus n being zero, 1 or 2, preferably zero or 1; and the radicals $R^{10}$ are identical or different and have the meanings stated for $R^{11}$, $R^{12}$ and $R^{13}$. Two adjacent $R^{10}$ radicals can be joined together to form a ring system, preferably a ring system containing from about 4–6 carbon atoms.

Alkyl refers to straight or branched chain substituents. Halogen (halogenated) is fluorine, chlorine, bromine or iodine atoms, preferably fluorine or chlorine.

Particularly preferred metallocenes are compounds of the structures:

(A)

(B)

wherein:

$M^1$ is Zr or Hf, $R^1$ and $R^2$ are methyl or chlorine, and $R^5$, $R^6$ $R^8$, $R^9$, $R^{10}$, $R^{11}$ and $R^{12}$ have the above-mentioned meanings.

The chiral metallocenes may be used as a racemate for the preparation of highly isotactic polypropylene polymers and copolymers. It is also possible to use the pure R or S form. An optically active polymer can be prepared with these pure stereoisomeric forms. Preferably the meso form of the metallocene is removed to ensure the center (i.e., the metal atom) provides stereoregular polymerization. Separation of the stereoisomers can be accomplished by known literature techniques. For special products it is also possible to use rac/meso mixtures.

Generally, the metallocenes are prepared by a multi-step process involving repeated deprotonations/metallations of the aromatic ligands and introduction of the bridge and the central atom by their halogen derivatives. The following reaction scheme illustrates this generic approach:

Additional methods for preparing metallocenes of the present invention are fully described in the *Journal of Organometallic Chem.*, volume 288, (1958), pages 63–67, and in EP-A- 320762, for preparation of the metallocenes described, both of which are herein fully incorporated by reference.

Illustrative but non-limiting examples of some preferred metallocenes include: Dimethylsilandiylbis (2-methyl-4- phenyl-1-indenyl)ZrCl₂ Dimethylsilandiylbis(2-methyl-4,5-benzoindenyl)ZrCl₂; Dimethylsilandiylbis(2-methyl-4,6-diisopropylindenyl)ZrCl₂; Dimethylsilandiylbis(2-ethyl4-phenyl-1-indenyl)ZrCl₂; Dimethylsilandiylbis (2-ethyl-4-naphthyl-1-indenyl)ZrCl₂, Phenyl(Methyl)silandiylbis(2-methyl4-phenyl-1-indenyl)ZrCl₂, Dimethylsilandiylbis(2-methyl-4-(1-naphthyl)-1-indenyl)ZrCl₂, Dimethylsilandiylbis(2-methyl-4-(2-naphthyl)-1-indenyl) ZrCl₂, Dimethylsilandiylbis(2-methyl-indenyl)ZrCl₂, Dimethylsilandiylbis(2-methyl-4,5-diisopropyl-1-indenyl) ZrCl₂, Dimethylsilandiylbis(2,4,6-trimethyl-1-indenyl) ZrCl₂, Phenyl(Methyl)silandiylbis(2-methyl-4,6-diisopropyl-1-indenyl)ZrCl₂, 1,2-Ethandiylbis(2-methyl-4,6-diisopropyl-1-indenyl)ZrCl₂, 1,2-Butandiylbis(2-methyl-4,6-diisopropyl-1-indenyl)ZrCl₂, Dimethylsilandiylbis(2-methyl-4-ethyl1-indenyl)ZrCl₂, Dimethylsilandiylbis(2-methyl-4-isopropyl-1-indenyl)ZrCl₂, Dimethylsilandiylbis (2-methyl-4-t-butyl-1-indenyl)ZrCl₂, Phenyl(Methyl) silandiylbis(2-methyl4-isopropyl-1-indenyl)ZrCl₂, Dimethylsilandiylbis(2-ethyl-4-methyl1-indenyl)ZrCl₂, Dimethylsilandiylbis(2,4-dimethyl-1indenyl)ZrCl₂, Dimethylsilandiylbis(2-methyl-4-ethyl-1-indenyl)ZrCl₂, Dimethylsilandiylbis(2-methyl-α-acenaphth-1-indenyl) ZrCl₂, Phenyl(Methyl)silandiylbis(2-methyl-4,5-benzo-1-indenyl)ZrCl₂, Phenyl(Methyl)silandiylbis(2-methyl-4,5-(methylbenzo)-1-indenyl)ZrCl₂, Phenyl(Methyl)silandiylbis (2-methyl-4,5-(tetramethylbenzo)-1-indenyl)ZrCl₂, Phenyl (Methyl)silandiylbis(2-methyl-a-acenaphth-1-indenyl) ZrCl₂, 1,2-Ethandiylbis(2-methyl-4,5-benzo-1-indenyl) ZrCl₂, 1,2-Butandiylbis(2-methyl-4,5-benzo-1-indenyl) ZrCl₂, Dimethylsilandiylbis(2-methyl-4,5-benzo-1-indenyl) ZrCl₂, 1,2-Ethandiylbis(2,4,7-trimethyl-1-indenyl)ZrCl₂, Dimethylsilandiylbis(2-methyl-1-indenyl)ZrCl₂, 1,2-Ethandiylbis(2-methyl-1-indenyl)ZrCl₂, Phenyl(Methyl) silandiylbis(2-methyl-1-indenyl)ZrCl₂, Diphenylsilandiylbis(2-methyl-1-indenyl)ZrCl₂, 1,2-Butandiylbis(2-methyl-1-indenyl)ZrCl₂, Dimethylsilandiylbis(2-ethyl-1-indenyl)ZrCl₂, Dimethylsilandiylbis(2-methyl-5-isobutyl-1-indenyl)ZrCl₂, Phenyl(Methyl)silandiylbis(2-methyl-5-isobutyl-1-indenyl) ZrCl₂, Dimethylsilandiylbis(2-methyl-5-t-butyl-1-indenyl) ZrCl₂, Dimethylsilandiylbis(2,5,6-trimethyl-1-indenyl) ZrCl2, and the like.

Some preferred metallocene catalyst components are described in detail in U.S. Pat. Nos. 5,149,819, 5,243,001, 5,239,022, 5,296,434 and 5,276,208 all of which are herein fully incorporated by reference. In addition, the bis-amido and bis-arylamido transition metal catalysts of U.S. Pat. No. 5,318,935 and copending U.S. patent application Ser. No. 08/803,687, filed Feb. 24, 1997, and the α-diimine nickel catalyst complexes of WO 96/23010 can be useful in incorporating the macromers of the present invention into the backbone.

Most preferably, the catalyst used to produce the branched polyolefin of the present invention is a dimethylsilyl-bridged bis-indenyl zirconocene or hafnocene such as dimethylsilyl bis(2-methyl-indenyl) ZrCl₂, dimethylsilyl bis(2-methyl-4-phenyl-1-indenyl) ZrCl₂, dimethylsilyl bis(2-methyl-4-(1-naphthyl)-1-indenyl) ZrCl₂, or dimethylsilyl bis(indenyl) hafnium dimethyl.

Preferably, the catalysts used to produce the syndiotactic polypropylene backbone of the present invention are those disclosed in U.S. Pat. Nos. 4,892,851, 5,155,080, and 5,132,381, the disclosures of which are hereby incorporated by reference.

The terms "cocatalyst" and "activator" are used herein interchangeably and are defined to be any compound or component which can activate a bulky ligand transition metal compound or a metallocene, as defined above. Alumoxane may be used as an activator. There are a variety of methods for preparing alumoxane, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031 and EP-A-0 561 476, EP-B1-0 279 586, EP-A-0 594-218 and WO 94/10180, each of which is fully incorporated herein by reference. It may be preferable to use a visually clear methylalumoxane. A cloudy or gelled alumoxane can be filtered to produce a clear solution or clear alumoxane can be decanted from the cloudy solution.

It is also within the scope of this invention to use ionizing activators, neutral or ionic, or compounds such as tri(n-butyl)ammonium tetrakis(pentaflurophenyl)boron, which ionize the neutral metallocene compound. Such ionizing compounds may contain an active proton, or some other cation associated with but not coordinated or only loosely coordinated to the remaining ion of the ionizing compound. Combinations of activators are also contemplated by the invention, for example, alumoxane and ionizing activators in combinations, see for example, WO 94/07928.

Descriptions of ionic catalysts for coordination polymerization comprised of metallocene cations activated by non-coordinating anions appear in the early work in EP-A-0 277 003, EP-A-0 277 004 and U.S. Pat. No. 5,198,401 and WO-A-92/00333 (incorporated herein by reference). These teach a preferred method of preparation wherein metallocenes (bisCp and monoCp) are protonated by an anion precursor such that an alkyl/hydride group is abstracted from a transition metal to make it both cationic and charge-balanced by the non-coordinating anion.

The term "noncoordinating anion" means an anion which either does not coordinate to said cation or which is only weakly coordinated to said cation thereby remaining sufficiently labile to be displaced by a neutral Lewis base. "Compatible" noncoordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion. Noncoordinating anions useful in accordance with this invention are those which are compatible, stabilize the metallocene cation in the sense of balancing its ionic charge in a +1 state, yet retain sufficient lability to permit displacement by an ethylenically or acetylenically unsaturated monomer during polymerization.

The use of ionizing ionic compounds not containing an active proton but capable of producing the both the active metallocene cation and an noncoordinating anion is also known. See, EP-A-0 426 637 and EP-A- 0 573 403 (incorporated herein by reference). An additional method of making the ionic catalysts uses ionizing anion pre-cursors which are initially neutral Lewis acids but form the cation and anion upon ionizing reaction with the metallocene compounds, for example the use of tris(pentafluorophenyl) boron. See EP-A-0 520 732 (incorporated herein by reference). Ionic catalysts for addition polymerization can also be prepared by oxidation of the metal centers of transition metal compounds by anion pre-cursors containing metallic oxidizing groups along with the anion groups, see EP-A-0 495 375 (incorporated herein by reference).

Where the metal ligands include halogen moieties (for example, bis-cyclopentadienyl zirconium dichloride) which are not capable of ionizing abstraction under standard conditions, they can be converted via known alkylation reactions with organometallic compounds such as lithium or aluminum hydrides or alkyls, alkylalumoxanes, Grignard reagents, etc. See EP-A-0 500 944 and EP-A-1-0 570 982 (incorporated herein by reference) for in situ processes describing the reaction of alkyl aluminum compounds with dihalo-substituted metallocene compounds prior to or with the addition of activating anionic compounds.

Support Materials

The metallocenes described herein are preferably supported using a porous particulate material, such as for example, talc, inorganic oxides, inorganic chlorides and resinous materials such as polyolefin or polymeric compounds.

The most preferred support materials are porous inorganic oxide materials, which include those from the Periodic Table of Elements of Groups 2, 3, 4, 5, 13 or 14 metal oxides. Silica, alumina, silica-alumina, and mixtures thereof are particularly preferred. Other inorganic oxides that may be employed either alone or in combination with the silica, alumina or silica-alumina are magnesia, titania, zirconia, and the like.

Preferably the support material is porous silica which has a surface area in the range of from about 10 to about 700 $m^2/g$, a total pore volume in the range of from about 0.1 to about 4.0 cc/g and an average particle size in the range of from about 10 to about 500 $\mu$m. More preferably, the surface area is in the range of from about 50 to about 500 $m^2/g$, the pore volume is in the range of from about 0.5 to about 3.5 cc/g and the average particle size is in the range of from about 20 to about 200 $\mu$m. Most preferably the surface area is in the range of from about 100 to about 400 $m^2/g$, the pore volume is in the range of from about 0.8 to about 3.0 cc/g and the average particle size is in the range of from about 30 to about 100 $\mu$m. The average pore size of typical porous support materials is in the range of from about 10 to about 1000 Å. Preferably, a support material is used that has an average pore diameter of from about 50 to about 500 Å, and most preferably from about 75 to about 350Å. It may be particularly desirable to dehydrate the silica at a temperature of from about 100° C. to about 800° C. anywhere from about 3 to about 24 hours.

The metallocenes, activator and support material may be combined in any number of ways. Suitable support techniques are described in U.S. Pat. Nos. 4,808,561 and 4,701,432 (each fully incorporated herein by reference.). Preferably the metallocenes and activator are combined and their reaction product supported on the porous support material as described in U. S. Pat. No. 5,240,894 and WO 94/28034, WO 96/00243, and WO 96/00245 (each fully incorporated herein by reference.) Alternatively, the metallocenes may be preactivated separately and then combined with the support material either separately or together. If the metallocenes are separately supported, then preferably, they are dried then combined as a powder before use in polymerization.

Regardless of whether the metallocene and activator are separately precontacted or whether the metallocene and activator are combined at once, the total volume of reaction solution applied to porous support is preferably less than about 4 times the total pore volume of the porous support, more preferably less than about 3 times the total pore volume of the porous support and even more preferably in the range of from more than about 1 to less than about 2.5 times the total pore volume of the porous support. Procedures for measuring the total pore volume of porous support are well known in the art. The preferred method is described in Volume 1, *Experimental Methods in Catalyst Research*, Academic Press, 1968, pages 67–96.

Methods of supporting ionic catalysts comprising metallocene cations and noncoordinating anions are described in WO 91/09882, WO 94/03506, WO 96/04319 and U.S. Pat. No. 5,643,847 (incorporated herein by reference). The methods generally comprise either physical adsorption on traditional polymeric or inorganic supports that have been largely dehydrated and dehydroxylated, or using neutral anion precursors that are sufficiently strong Lewis acids to activate retained hydroxy groups in silica containing inorganic oxide supports such that the Lewis acid becomes covalently bound and the hydrogen of the hydroxy group is available to protonate the metallocene compounds.

The supported catalyst system may be used directly in polymerization or the catalyst system may be prepolymerized using methods well known in the art. For details regarding prepolymerization, see U.S. Pat. Nos. 4,923,833 and 4,921,825, EP 0 279 863 and EP 0 354 893 each of which is fully incorporated herein by reference.

Polymerization Processes

The branched polyolefin of the present invention may be produced using the catalysts described above in any process including gas, slurry or solution phase or high pressure autoclave processes. (As used herein, unless differentiated, "polymerization" includes copolymerization and "monomer" includes comonomer.) Additionally, combinations of the above reactor types in multiple, series reactors and/or multiple reaction conditions and/or multiple catalyst configurations are explicitly intended. Preferably, a gas or slurry phase process is used, most preferably a bulk liquid propylene polymerization process is used.

In the preferred embodiment, this invention is directed toward the bulk liquid polymerization and copolymerization of propylene in a slurry or gas phase polymerization process, particularly a slurry polymerization process. Another embodiment involves copolymerization reactions of propylene with one or more comonomers. Such comonomers include alpha-olefin monomers having from 4 to 20 carbon atoms, preferably 4–12 carbon atoms, for example alpha-olefin comonomers of ethylene, butene-1, pentene-1, 4-methylpentene-1, hexene-1, octene-1, decene-1. Other suitable comonomers include geminally disubstituted monomers, $C_5$–$C_{25}$ cyclic olefins such as cyclopentene or norbornene, styrenic olefins such as styrene, and lower carbon number ($C_3$–$C_8$) alkyl substituted analogs of the cyclic and styrenic olefins. In addition, comonomers such as polar vinyl, diolefins such as dienes, for example, 1,3-butadiene, 1,4-hexadiene, norbornadiene or vinylnorbornene, acetylene and aldehyde monomers are suitable.

Typically in a gas phase polymerization process a continuous cycle is employed wherein one part of the cycle of a reactor, a cycling gas stream, otherwise known as a recycle stream or fluidizing medium, is heated in the reactor by the heat of polymerization. The recycle stream usually contains one or more monomers continuously cycled through a fluidized bed in the presence of a catalyst under reactive conditions. This heat is removed in another part of the cycle by a cooling system external to the reactor. The recycle stream is withdrawn from the fluidized bed and recycled back into the reactor. Simultaneously, polymer product is withdrawn from the reactor and new or fresh monomer is added to replace the polymerized monomer. (See for example U.S. Pat. Nos. 4,543,399; 4,588,790; 5,028,670; 5,352,749; 5,405,922, and 5,436,304 all of which are fully incorporated herein by reference.)

A slurry polymerization process generally uses pressures in the range of from about 1 to about 500 atmospheres or even greater and temperatures in the range of from −60° C. to about 280° C. In a slurry polymerization, a suspension of solid, particulate polymer is formed in a liquid or supercritical polymerization medium to which propylene and comonomers and often hydrogen along with catalyst are added. The liquid employed in the polymerization medium can be, for example, an alkane or a cycloalkane. The medium employed should be liquid under the conditions of polymerization and relatively inert such as hexane and isobutane. In the preferred embodiment, propylene serves as the polymerization diluent and the polymerization is carried out using a pressure of from about 200 kPa to about 7,000 kPa at a temperature in the range of from about 50° C. to about 120° C.

The periods of time for each stage will depend upon the catalyst system, comonomer and reaction conditions. In general, propylene should be homopolymerized for a time period sufficient to yield a composition having from about 10 to about 90 weight percent homopolymer based on the total weight of the polymer, preferably from about 20 to about 80 weight percent, even more preferably from about 30 to about 70 homopolymer weight percent based on the total weight of the polymer.

The above-described temperatures, reaction times and other conditions are considered suitable polypropylene polymerization conditions for the purposes of this invention.

The polymerization may be conducted in batch or continuous mode and the entire polymerization may take place in one reactor or, preferably, the polymerization may be carried out in a series of reactors. If reactors in series are used, then the comonomer may be added to any reactor in the series, however, preferably, the comonomer is added to the second or subsequent reactor.

Hydrogen may be added to the polymerization system as a molecular weight regulator in the first and/or subsequent reactors depending upon the particular properties of the product desired and the specific metallocenes used. When metallocenes having different hydrogen responses are used, the addition of hydrogen will affect the molecular weight distribution of the polymer product accordingly. A preferred product form is to have the comonomer be present in the high molecular weight species of the total polymer composition to provide a favorable balance of good film stretchability without breaking, coupled with low extractables, low haze and good moisture barrier in the film. Accordingly in this preferred case, the same or lower levels of hydrogen are utilized during copolymerization as were used during polymerization in the second or subsequent reactor.

For both polyethylene macromer product and branched polyolefin preparation, it is known that many methods and permutations of the ordering of addition of macromer and monomer species to the reactor are possible, some more advantageous than others. For example, it is widely known in the art that preactivation of the metallocene with alumoxane before addition to a continuous solution-phase reactor yields higher activities than continuous addition of metallocene and activator in two separate streams. Furthermore, it may be advantageous to control precontacting time to maximize catalyst effectiveness, e.g., avoiding excessive aging of the activated catalyst composition.

It is preferable to use the polyethylene macromers such that they are promptly functionalized or copolymerized after being prepared. The highly reactive vinyl groups appear to be susceptible to by-product reactions with adventitious impurities and, even, dimerization or addition reactions with other unsaturated group-containing polymeric chains. Thus maintaining in a cooled, inert environment after preparation and prompt subsequent use will optimize the effectiveness of the use of the polyethylene macromer product. A continuous process utilizing series reactors, or parallel reactors will thus be effective, the polyethylene macromer product being prepared in one and continuously introduced into the other.

Industrial Utility

The branched polyolefin polymers of the present invention exhibit improved melt strength and shear thinning characteristics to standard propylene copolymers. This results in improved processability of the polymers, e.g. increased shear thinning and high output for a constant energy input. These characteristics will result in improved processing in blow molding and thermoforming operations. For example, in thermoforming operations sag will be decreased and power consumption will be lowered in the extruders.

In order that the invention may be more readily understood, reference is made to the following examples, which are intended to illustrate the invention but not to limit the scope thereof.

EXAMPLES

General

All polymerizations were performed in a 2-liter Zipperclave reactor equipped with a water jacket for temperature control. Liquids were measured into the reactor using calibrated sight glasses. High purity (>99.5%) toluene was purified by passing first through basic alumina activated at high temperature in nitrogen, followed by molecular sieve activated at high temperature in nitrogen. Polymerization grade ethylene was supplied directly in a nitrogen-jacketed line and used without further purification. Propylene was purified by passing through activated basic alumina and molecular sieves. Methylalumoxane (MAO, 10% in toluene) was received from Albemarle Inc. in stainless steel cylinders, divided into 1-liter glass containers, and stored in a laboratory glove-box at ambient temperature.

For the polymer synthesis, propylene was measured into the reactor through a calibrated container. To ensure the reaction medium was well-mixed, a flat-paddle stirrer rotating at 750 rpm was used.

Reactor Preparation

The reactor was first cleaned by heating to 150° C. in toluene to dissolve any polymer residues, then cooled and drained. Next, the reactor was heated using jacket water at 110° C. and the reactor was purged with flowing nitrogen for a period of ~30 minutes. Before reaction, the reactor was further purged using 3 nitrogen pressurize/vent cycles (to 100 psi). The cycling served two purposes: (1) to thoroughly penetrate all dead ends such as pressure gauges to purge fugitive contaminants and (2) to pressure test the reactor.

Catalysts

All catalyst preparations were performed in an inert atmosphere with <1.5 ppm $H_2O$ content. The catalyst system used in the synthesis of macromer was $Cp_2ZrCl_2$ activated with MAO. The catalyst systems used in the synthesis of branched olefin copolymer were dimethylsilyl bis(indenyl) hafnium dimethyl and dimethylsilyl bis(2-methyl indenyl) zirconium dichloride. The dimethylsilyl bis(indenyl) hafnium dimethyl was activated with $[DMAH]^+ [(C_6F_5)_4B]^-$. The dimethylsilyl bis(2-methyl indenyl) zirconium dichloride was activated with MAO. To maximize solubility of the metallocene, toluene was used as a solvent. The catalyst was added to a stainless steel tube by pipette and transferred to the reactor.

Macromer Synthesis—General

Ethylene was added to the reactor as needed to maintain total system pressure at the reported levels (semi-batch operation). Ethylene flow rate was monitored using a Matheson mass flow meter (model number 8272-0424). To ensure the reaction medium was well-mixed, a flat-paddle stirrer rotating at 750 rpm was used.

Example 1

The reactor was simultaneously purged of nitrogen and pressure tested using two ethylene fill/purge cycles (to 300 psig). Then, the reactor pressure was raised to ~40 psi to maintain positive reactor pressure during setup operations. Jacket water temperature was set to 120° C. and 1200 milliliters of toluene were added to the reactor. The stirrer was set to 750 rpm. Additional ethylene was added to maintain a positive reactor gauge pressure as gas phase ethylene was absorbed into solution. The system was allowed to reach a steady temperature. The ethylene pressure regulator was next set to 40 psig and ethylene was added to the system until a steady state was achieved as measured by zero ethylene uptake. The reactor was isolated and a pulse of toluene pressurized to 300 psig was used to force the catalyst solution from the addition tube into the reactor. The ethylene supply manifold was immediately opened to the reactor in order to maintain a constant reactor pressure as ethylene was consumed by reaction.

After 60 minutes of reaction, the reactor was isolated, cooled to room temperature and methanol was added to precipitate the macromer product. The yield was 48 g. The polymer product had an Mn of 7,500 and a vinyl end group percentage of 73.

Example 2

The reactor was simultaneously purged of nitrogen and pressure tested using two ethylene fill/purge cycles (to 300 psig). Then, the reactor pressure was raised to ~40 psi to maintain positive reactor pressure during setup operations. Jacket water temperature was set to 120° C. and 1200 milliliters of toluene were added to the reactor. The stirrer was set to 750 rpm. Additional ethylene was added to maintain a positive reactor gauge pressure as gas phase ethylene was absorbed into solution. The system was allowed to reach a steady temperature. The ethylene pressure regulator was next set to 40 psig and ethylene was added to the system until a steady state was achieved as measured by zero ethylene uptake. The reactor was isolated and a pulse of toluene pressurized to 300 psig was used to force the catalyst solution from the addition tube into the reactor. The ethylene supply manifold was immediately opened to the reactor in order to maintain a constant reactor pressure as ethylene was consumed by reaction.

After 20 minutes of reaction, the reactor was isolated, cooled to room temperature and methanol was added to precipitate the macromer product. The yield was 23.3 g. The polymer product had an Mn of 4,300 and a vinyl end group percentage of 73.

Example 3

A 2-liter reactor was charged with toluene (1 L), propylene (150 mL), 10 g of the polyethylene macromer from Example 1 and Triisobutylaluminum (2.0 mL of 1M solution in toluene). The reactor was heated to 90° C. and equilibrated for 5 min. Then 2 mg of dimethylsilyl bis(indenyl) hafnium dimethyl and 6 mg of [DMAH]$^+$ [(C$_6$F$_5$)$_4$ B]$^-$ in 5 mL of toluene were injected using a catalyst tube. After 15 min, the reactor was cooled to 25° C. and vented. The polymer was collected by filtration and dried in air for 12 hours. Yield: 40 g.

Example 4

A 2-liter autoclave reactor was charged with toluene (1 L), propylene (150 mL), 10 g of the polyethylene macromer from Example 1 and Triisobutylaluminum (2.0 mL of 1M solution in toluene). The reactor was heated to 90° C. and equilibrated for 5 min. Then 2 mg of dimethylsilyl bis(2-methyl indenyl) zirconium dichloride activated in 5 mL of toluene and 1 mL of MAO (10 wt % in toluene) was injected using a catalyst tube. After 15 min, the reactor was cooled to 25° C. and vented. The polymer was collected by filtration and dried in air for 12 hours. Yield: 40 g.

Example 5

A 2-liter autoclave reactor was charged with toluene (1 L), propylene (150 mL), 10 g of the polyethylene macromer from Example 2 and Triisobutylaluminum (2.0 mL of 1M solution in toluene). The reactor was heated to 50° C. and equilibrated for 5 min. Then 2 mg of dimethylsilyl bis(2-methyl indenyl) zirconium dichloride activated in 5 mL of toluene and 1 mL of MAO (10 wt % in toluene) was injected using a catalyst tube. After 15 min, the reactor was cooled to 25° C. and vented. The polymer was collected by filtration and dried in air for 12 hours. Yield: 53 g.

Example 6

A 2-liter autoclave reactor was charged with toluene (1 L), propylene (150 mL), 5 g of the polyethylene macromer from Example 2 and Triisobutylaluminum (2.0 mL of 1M solution in toluene). The reactor was heated to 50° C. and equilibrated for 5 min. Then 2 mg of dimethylsilyl bis(2-methyl indenyl) zirconium dichloride activated in 5 mL of toluene and 1 mL of MAO (10 wt % in toluene) was injected using a catalyst tube. After 15 min, the reactor was cooled to 25° C. and vented. The polymer was collected by filtration and dried in air for 12 hours. Yield: 51 g.

Comparative Example 7

A 2-liter reactor was charged with toluene (1 L), propylene (150 mL), and Triisobutylaluminum (2.0 mL of 1M solution in toluene). The reactor was heated to 50° C. and equilibrated for 5 min. Then 2 mg of dimethylsilyl bis(2-methyl indenyl) zirconium dichloride activated in 5 mL of toluene and 1 mL of MAO (10 wt % in toluene) was injected using a catalyst tube. After 15 min, the reactor was cooled to 25° C. and vented. The polymer was collected by filtration and dried in air for 12 hours. Yield: 63 g.

Product Characterization

Some general characterization data for the polymers made in the Examples 3–6 and Comparative Example 7 are listed in Table 1. The polymer product samples were analyzed by gel permeation chromatography using a Waters 150C high temperature system equipped with a DRI Detector, Shodex AT-806MS column and operating at a system temperature of 145° C. The solvent used was 1,2,4-trichlorobenzene, from which polymer sample solutions of 1.5 mg/ml concentration were prepared for injection. The total solvent flow rate was 1 ml/minute and the injection size was 300 microliters. After elution of the polymer samples, the resulting chromatograms were analyzed using the Waters Expert Ease program to calculate the molecular weight distribution and one or more of $M_n$, $M_w$ and $M_z$ averages.

The melting point of the polymer product samples was determined on a DSC 2910 Differential Scanning Calorimeter (TA Instruments). The reported melting points were recorded at second melt with a temperature ramp of 10° C./min. "Wt. % $C_2$" indicates the percentage of polyethylene macromer ($C_2$) incorporated into the polymer samples which was determined by Analytical Composition Distribution analysis.

TABLE 1

Physical Data Summary

| Example | Mw | MWD | Tm (° C.) | Wt. % $C_2$ |
|---|---|---|---|---|
| 3 | 76,278 | 2.07 | 127 | 4 |
| 4 | 53,844 | 2.37 | 148 | 9 |
| 5 | 164,394 | 4.62 | 147 | 10 |
| 6 | 138,267 | 3.78 | 149 | 3 |
| Comp. 7 | 154,267 | 1.68 | 149 | 0 |

Figure 1:
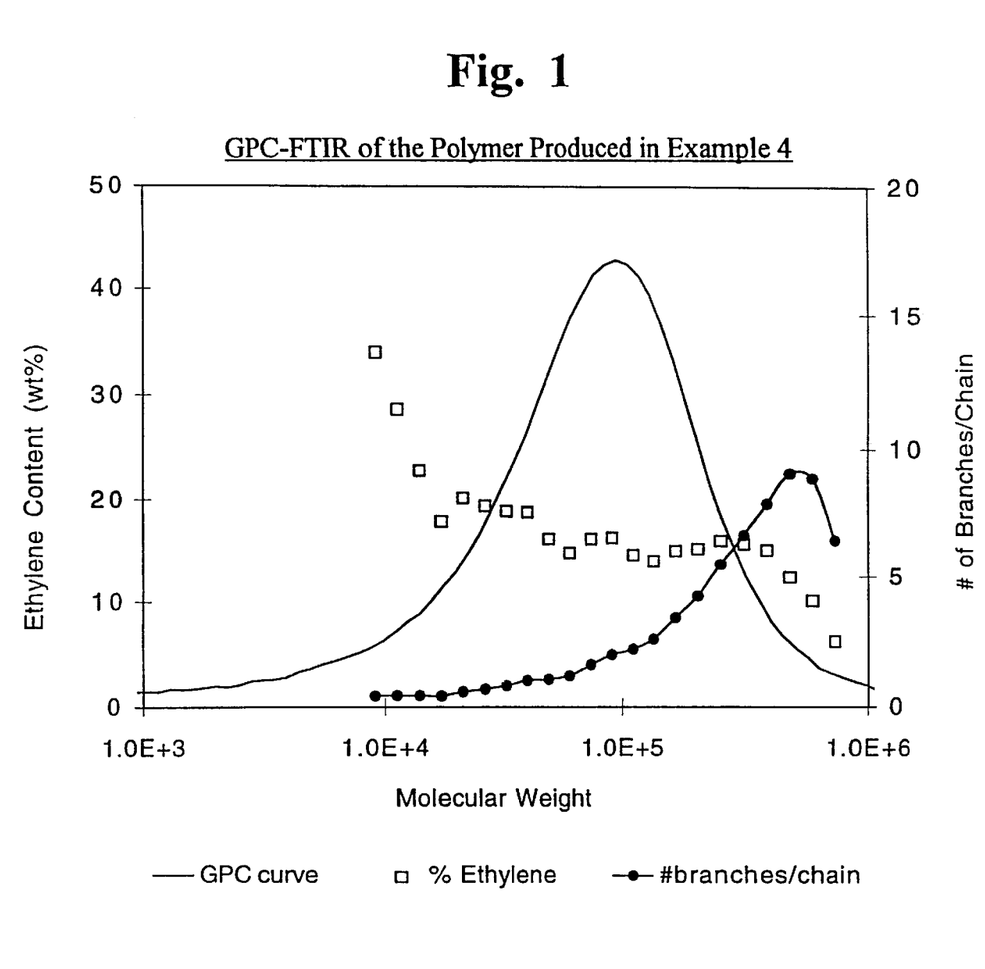
FIG. 1 is a graphic illustration of the GPC-FTIR data for the polymer produced in Example 4.

Additional analysis was conducted on the polymer produced in Example 4 to determine the amount of branching and branch distribution. Since the ethylene contents at various molecular weight regions can be readily determined by FTIR, it is possible to quantify the incorporation of macromer and calculate LCB distribution. Shown in FIG. 1 is the GPC-FTIR analysis for the polymer made in Example 4. The dots indicate the ethylene content measured by FTIR at different molecular weight along the GPC curve. Since the molecular weight (Mn) of the PE macromer is 7,500, the ethylene content detected at high molecular region clearly indicates the incorporation of macromer in the PP backbones. More importantly, it is possible to calculate the statistical LCB-distribution (also shown in FIG. 1). Assuming that all macromers have the equal probability of incorporation (all macromers are equally spaced along the PP backbones), then, the number of long chain branches at certain molecular weight may be calculated according to the following equation:

$$\# \text{ of } LCB/\text{Chain} = \frac{(MW \text{ of Polymer, } DRI)(\text{wt. fraction of } PE)}{(Mn \text{ of Macromer})(1 - \text{wt. fraction of } PE)}$$

Figure 2:
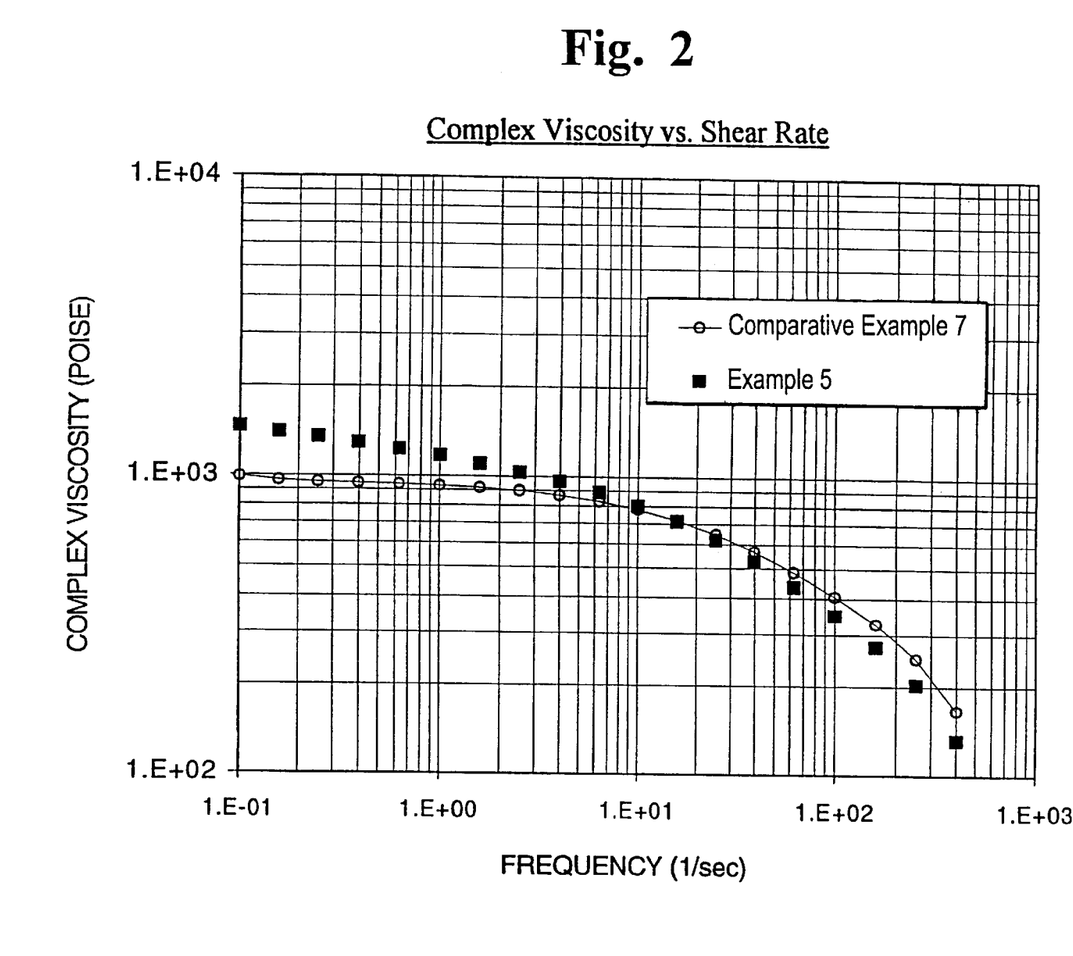
FIG. 2 is a graphic illustration of the complex viscosity vs. shear rate curve for the polymer products produced in Example 5 and Comparative Example 7.

FIG. 2 shows a complex viscosity vs. shear rate curve for the polymers produced in Example 5 and Comparative Example 7. Example 5 demonstrates a steeper curve than Comparative Example 7. A steeper curve correlates to improved shear thinning performance as the viscosity reduces more rapidly at high shear rates. Therefore, the polymer product which was produced using macromers demonstrates improved processability over a polymer which was produced without the use of macromers.

Example 8

Quantification of long chain branching was performed using the method of Randall, Rev. Macromol. Chem. Phys., C29, (2&3), p. 285–297. $^1$H-NMR analyses were performed using a 500 mHz Varian Unity model operating at 125° C. using $d_2$-tetrachloroethane as solvent. $^{13}$C-NMR analyses were performed using at 100 mHz frequency, a Varian Unity Plus model under the same conditions. Catalyst Preparation. A stainless steel catalyst addition tube was prepared as outlined above. An aliquot of 1 milliliter of 10% methylalumoxane (MAO) solution in toluene was added, followed by 16 mg of $Cp_2ZrCl_2$ in toluene solution. The sealed tube was removed from the glovebox and connected to a reactor port under a continuous flow of nitrogen. A flexible, stainless steel line from the reactor supply manifold was connected to the other end of the addition tube under a continuous flow of nitrogen. Macromer Synthesis. The 1-liter reactor was simultaneously purged of nitrogen and pressure tested using two ethylene fill/purge cycles (to 300 psig (2170 kPa)). Then, the reactor pressure was raised to ~20 psig(239 kPa)) to maintain positive reactor pressure during setup operations. Jacket water temperature was set to 90° C. and 600 milliliters of toluene were added to the reactor. The stirrer was set to 750 rpm. Additional ethylene was added to maintain a positive reactor gauge pressure as gas phase ethylene was absorbed into solution. The reactor temperature controller was set to 90° C. and the system was allowed to reach steady state. The ethylene pressure regulator was next set to 20 psig and ethylene was added to the system until a steady state was achieved as measured by zero ethylene uptake. The reactor was isolated and a pulse of toluene pressurized to 300 psig (2170 kPa) was used to force the catalyst solution from the addition tube into the reactor. The 20 psig (239 kPa) ethylene supply manifold was immediately opened to the reactor in order to maintain a constant reactor pressure as ethylene was consumed by reaction. After 8 minutes of reaction, the reaction solution was quickly heated to 150° C. for 30 minutes to kill the catalyst, then cooled to 90° C. A small macromer sample was removed via an addition port. Analysis by $^{13}$C-NMR indicated no measurable long chain branches were present in the macromer. The number and weight average molecular weights of the macromer were 9,268 and 23,587 Daltons, respectively, with 81.7% of olefins as vinyl.

While certain representative embodiments and details have been shown for the purposes of illustrating the invention, it will be apparent to those skilled in the art that various changes in the process and products disclosed herein may be made without departing from the scope of the invention, which is defined in the appended claims.

We claim:

1. A branched olefin polymer having an isotactic polypropylene backbone, optionally comprising monomer units from one or more comonomers, and sidechains derived from macromers comprising:
   (a) vinyl ended ethylene homopolymer or ethylene copylymer chains having a number average molecular weight (Mn) of about 1500 to 25,154, the number average molecular weight being determined by gel permeation chromatography (GPC) at 145° C.;
   (b) a ratio of vinyl groups to total olefin groups according to the formula:

(vinyl groups/olefin groups)>(comonomer mole percentage+0.1)$^a$× $10^a$×$b_z$ wherein a=−0.24 and b=0.8; or a=−0.20 and b=0.8; or a=−0.18 and b=0.83; or a=−0.15 and b=0.83; or a=−0.10 and b=0.85;
   wherein:
   1) the total number of vinyl groups per 1000 carbon atoms of the sidechains is greater than or equal to 8000÷Mn (as determined by $^1$H-NMR at 125° C.);
   2) the Mw/Mn of the side chains ranges from 2.083 to 5.666;
   3) the total comonomer content of the branched olefin copolymer is from 0 to 20 mole percent; and
   4) the mass ratio of the isotactic polypropylene to the sidechains ranges from 99.9:0.1 to 50:50.

2. The branched olefin polymer of claim 1 wherein the backbone contains 0 mole percent comonomer.

3. The branched olefin polymer of claim 1 wherein the backbone further comprises one or more comonomers selected from the group consisting of ethylene, $C_4$-$C_{20}$ α-olefins, geminally disubstituted olefins, $C_5$-$C_{25}$ cyclic olefins, and $C_3$-$C_8$ alkyl substituted analogs of the cyclic olefins.

4. The branched olefin polymer of claim 1 wherein the backbone further comprises one or more comonomers selected from the group consisting of ethylene, $C_4$-$C_{20}$ α-olefins, geminally disubstituted monomers, $C_5$-$C_{25}$ cyclic olefins, $C_5$-$C_{25}$ styrenic olefins, and lower carbon number ($C_3$-$C_8$) alkyl substituted analogs of the cyclic and styrenic olefins.

5. The branched olefin polymer of claim 1 wherein the backbone comprises highly isotactic polypropylene.

6. The branched olefin polymer of claim 1 wherein the backbone is a combination of isotactic and syndiotactic polypropylene.

7. The branched olefin polymer of claim 1 wherein the sidechains contain 0 mole percent of comonomer.

8. The branched olefin polymer of claim 1 wherein the sidechains contain 0 to 15 mole percent of comonomer.

9. The branched olefin polymer of claim 1 wherein the sidechains contain 1 to 10 mole percent of comonomer.

10. The branched olefin polymer of claim 1 wherein the sidechains contain 2 to 6 mole percent of comonomer.

11. The branched olefin polymer of claim 1 wherein the sidechains further comprise one or more comonomers selected from the group consisting of $C_3$-$C_{20}$ α-olefins, geminally disubstituted olefins, $C_5$-$C_{25}$ cyclic olefins, $C_8$-$C_{25}$ styrenic olefins, and $C_3$-$C_8$ alkyl substituted analogs of the cyclic and styrenic olefins.

12. The branched olefin polymer of claim 1 wherein the sidechain has an Mn above 3000 and a comonomer content of 0.2 to 4.0 mole percent.

13. The branched olefin polymer of claim 1 wherein the sidechain has an Mn above 3000 and 0.2 to 4.0 mole percent of a comonomer selected from the group consisting of 1-octene, 1-butene, norbornene and alkyl substituted norbornene.

14. The branched olefin polymer of claim 1 wherein the sidechain has a melt enthalpy of less than or equal to 90 cal/g.

15. The branched olefin polymer of claim 1 wherein the sidechains are have an Mn of more than 3000 and from 0.2 to 4.0 mole percent of one or more of 1-octene, norbornene, and 1-butene.

16. The branched olefin polymer of claim 1 wherein the sidechains comprise ethylene, at least one comonomer selected from $C_3$ to $C_{12}$ α-olefins and at least one additional comonomer.

17. The branched olefin polymer of claim 1 wherein the sidechains comprise ethylene, at least one comonomer selected from $C_3$ to $C_{12}$ α-olefins and at least one additional comonomer selected from the group consisting of $C_3$-$C_{20}$ α-olefins, geminally disubstituted olefins, $C_5$-$C_{25}$ cyclic olefins, $C_8$-$C_{25}$ styrenic olefins, and $C_3$-$C_8$ alkyl substituted analogs of the cyclic and styrenic olefins.

18. The branched olefin polymer of claim 1 wherein the sidechains comprise a mixture of sidechains with different molecular weights and/or compositions.

19. The branched olefin polymer of claim 1 wherein the backbone further comprises syndiotactic polypropylene.

20. The branched olefin polymer of claim 1 wherein the sidechains comprise one or more comonomers selected from the group consisting of $C_3$-$C_{20}$ α-olefins, geminally disubstituted monomers, $C_5$-$C_{25}$ cyclic olefins, $C_8$-$C_{25}$ styrenic olefins, and $C_3$-$C_8$ alkyl substituted analogs of the cyclic and styrenic olefins; and, the backbone comprises one or more comonomers selected from the group consisting of ethylene, $C_4$-$C_{20}$ α-olefins, geminally disubstituted olefins, $C_5$-$C_{25}$ cyclic olefins, $C_8$-$C_{25}$ styrenic olefins, and $C_3$-$C_8$ alkyl substituted analogs of the cyclic and styrenic olefins.

21. The branched olefin polymer of claim 1 wherein the sidechains comprise 1 to 10 mole percent of one or more comonomers selected from the group consisting of $C_3$-$C_{20}$ α-olefins, geminally disubstituted olefins, $C_5$-$C_{25}$ cyclic olefins, $C_8$-$C_{25}$ styrenic olefins, and $C_3$-$C_8$ alkyl substituted analogs of the cyclic and styrenic olefins; and the backbone comprises one or more comonomers selected from the group consisting of ethylene, $C_4$-$C_{20}$ α-olefins, geminally disubstituted olefins, $C_5$-$C_{25}$ cyclic olefins, $C_8$-$C_{25}$ styrenic olefins, and $C_3$-$C_8$ alkyl substituted analogs of the cyclic and styrenic olefins; and the total comonomer content of the branched olefin polymer is from 3 to 20 mole percent.

22. The branched olefin polymer of claim 1 wherein the sidechains comprise 1 to 10 mole percent of one or more comonomers selected from the group consisting of $C_3$-$C_{20}$ α-olefins, and the backbone comprises one or more comonomers selected from the group consisting of ethylene and $C_4$-$C_{20}$ α-olefins; and the total comonomer content of the branched olefin polymer is from 3 to 20 mole percent.

23. The branched olefin polymer of claim 1 wherein the sidechains are homopolyethylene and the backbone is homopolypropylene.

24. The branched olefin polymer of claim 1 wherein the sidechains are homopolyethylene and the backbone is highly isotactic polypropylene.

25. The branched olefin polymer of claim 1 wherein the sidechains have an Mn of more than 3000 and from 0.2 to 4.0 mole percent of one or more of 1-octene, 1-butene, norbornene, or alkyl-substituted norbornene, and the backbone is homopolypropylene.

26. The branched olefin polymer of claim 1 wherein the sidechains have an Mn of more than 3000 and from 0.2 to 4.0 mole percent of 1-octene and/or 1-butene, and the backbone is highly isotactic polypropylene.

27. The branched olefin polymer of claim 1 wherein the sidechains have an Mn of more than 3000 and from 0.2 to 4.0 mole percent of one or more of 1-octene, norbornene or 1-butene, and the backbone is homopolypropylene.

28. The branched olefin polymer of claim 1 wherein the sidechains have an Mn of more than 3000 and from 0.2 to 4.0 mole percent of 1-octene, 1-butene, norbornene, or alkyl-substituted norbornene and the backbone is copolymer of propylene and one or more of ethylene and/or $C_4$ to $C_{20}$ α-olefins.

29. The branched olefin polymer of claim 1 wherein the sidechains have an Mn of more than 3000 and from 0.2 to 4.0 mole percent of 1-octene, and/or 1-butene; and the backbone is a copolymer of propylene and one or more of ethylene and/or $C_4$ to $C_{20}$ α-olefins; and the total comonomer content of the branched olefin polymer is from 3 to 20 mole percent.

30. The branched olefin polymer of claim 1 wherein the sidechains have an Mn of more than 3000 and from 0.2 to 4.0 mole percent of one or more of 1-octene, norbornene, and 1-butene; and the backbone is a copolymer of propylene and one or more of ethylene and/or $C_4$ to $C_{20}$ α-olefins; and the total comonomer content of the branched olefin polymer is from 5 to 17 mole percent.

31. The branched olefin polymer of claim 1 where the total comonomer content of the branched olefin copolymer is from 3 to 20 mole percent of said branched olefin copolymer.

32. The polyolefin product of claim 1 where the total comonomer content of the branched olefin copolymer is from 5 to 17 mole percent of said branched olefin copolymer.

33. The branched olefin copolymer of claim 1 wherein the mass ratio of the backbone to the sidechains ranges from 95:5 to 50:50.

34. The branched olefin polymer of claim 1 wherein the polymer has dual melting points characteristic of crystalline polypropylene and crystalline polyethylene.

35. A branched olefin polymer having an isotactic polypropylene backbone, optionally comprising monomer units from one or more comonomers, and sidechains derived from macromers comprising:
(a) vinyl ended copolymer chains having a number average molecular weight ($M_a$) of about 1500 to 75,000, the number average molecular weight being determined by gel permeation chromatography (GPC) at 145° C.; and
(b) a ratio of vinyl groups to total olefin groups according to the formula:

(vinyl groups/olefin groups)>(comonomer mole percentage+0.1)$^a$× 10$^a$×b, wherein a=−0.24 and b=0.8; or a=−0.20 and b=0.8; or a=−0.18 and b=0.83; or a=−0.15, b=0.83; or a=−0.10 and b=0.85;
wherein:
1) the total number of vinyl groups per 1000 carbon atoms of the sidechains is greater than or equal to 8000÷$M_a$ (as measured by $^1$H-NMR at 125° C.);
2) the $M_w/M_n$ of the sidechains ranges from 2.083 to 5.666; and
3) the vinyl ended copolymer chains comprise ethylene and at least one comonomer selected from $C_3$ to $C_{12}$ α-olefins.

36. The branched olefin polymer of claim 35 wherein backbone contains 0 mole percent comonomer.

37. The branched olefin polymer of claim 35 wherein the backbone further comprises one or more comonomers selected from the group consisting of ethylene, $C_4$-$C_{20}$ α-olefins, geminally disubstituted olefins, $C_5$-$C_{25}$ cyclic olefins, $C_8$-$C_{25}$ styrenic olefins, and $C_3$-$C_8$ alkyl substituted analogs of the cyclic and styrenic olefins.

38. The branched olefin polymer of claim 35 wherein the backbone is a combination of isotactic and syndiotactic polypropylene.

39. The branched olefin polymer of claim 35 wherein the backbone is a combination of isotactic and syndiotactic polypropylene.

40. The branched olefin polymer of claim 35 wherein the sidechains contain 1 to 15 mole percent of comonomer.

41. The branched olefin polymer of claim 35 wherein the sidechains contain 1 to 10 mole percent of comonomer.

42. The branched olefin polymer of claim 35 wherein the sidechains contain 2 to 6 mole percent of comonomer.

43. The branched olefin polymer of claim 35 wherein the sidechains have an Mn above 3000 and a comonomer content of 0.2 to 4.0 mole percent.

44. The branched olefin polymer of claim 35 wherein the sidechains have an Mn above 3000 and 0.2 to 4.0 mole percent of 1-octene and/or 1-butene.

45. The branched olefin polymer of claim 35 wherein the sidechains have a melt enthalpy of less than or equal to 90 cal/g.

46. The branched olefin polymer of claim 35 wherein the sidechains comprise ethylene, at least one comonomer selected from $C_3$ to $C_{12}$ α-olefins and at least one additional comonomer.

47. The branched olefin polymer of claim 35 wherein the sidechains comprises ethylene, at least one comonomer selected from $C_3$ to $C_{20}$ α-olefins and at least one additional comonomer selected from the group consisting of $C_3$-$C_{20}$ αolefins, geminally disubstituted olefins, $C_5$-$C_{25}$ cyclic olefins, $C_8$-$C_{25}$ styrenic olefins, and $C_3$-$C_8$ alkyl substituted analogs of the cyclic and styrenic olefins.

48. The branched olefin polymer of claim 35 wherein the sidechains comprise a mixture of sidechains with different molecular weights and/or compositions.

49. The branched olefin polymer of claim 35 wherein the sidechains comprise 1 to 10 mole percent of one or more comonomers; and the backbone comprises one or more comonomers selected from the group consisting of $C_3$-$C_{20}$ α-olefins; and the total comonomer content of the branched olefin polymer is from 3 to 20 mole percent.

50. The branched olefin polymer of claim 35 wherein the sidechains have an Mn of more than 3000 and from 0.2 to 4.0 mole percent of one or more of 1-octene and/or 1-butene and the backbone is homopolypropylene.

51. The branched olefin polymer of claim 35 wherein the sidechains have an Mn of more than 3000 and from 0.2 to 4.0 mole percent of 1-octene and/or, 1-butene, and the backbone is copolymer of propylene and one or more of ethylene and/or $C_4$ to $C_{20}$ alpha-olefins.

52. The branched olefin polymer of claim 35 wherein the sidechains are have an Mn of more than 3000 and from 0.2 to 4.0 mole percent of 1-octene and/or 1-butene; and the backbone is a copolymer of propylene and one or more of ethylene and/or $C_4$ to $C_{20}$ α-olefins; and the total comonomer content of the branched olefin polymer is from 3 to 20 mole percent.

53. The branched olefin polymer of claim 35 wherein the sidechains have an Mn of more than 3000 and from 0.2 to 4.0 mole percent of one or more of 1-octene and/or 1-butene; and the backbone is a copolymer of propylene and ethylene and/or one or more $C_4$ to $C_{20}$ alpha-olefins; and the total comonomer content of the branched olefin polymer is from 5 to 17 mole percent.

54. The branched olefin polymer of claim 35 where the total comonomer content of the branched olefin copolymer is from 3 to 20 mole percent of said branched olefin copolymer.

55. The polyolefin product of claim 35 where the total comonomer content of the branched olefin copolymer is from 5 to 17 mole percent of said branched olefin copolymer.

56. A process to produce a branched olefin copolymer having an isotactic polypropylene backbone, optionally comprising monomer units from one or more comonomers, and sidechains derived from macromers comprising:
a) contacting ethylene and, optionally with one or more copolymerizable monomers, with a transition metal olefin polymerization catalyst activated by an alumoxane cocatalyst, the mole ratio of aluminum to transition metal is between 20:1 and 100:1, in a solution at a temperature of 30 to 150° C. and a pressure of up to 345 MPa;
b) obtaining a polymer product having:
1) greater than 40% chain end-group unsaturation,
2) a number average molecular weight (Mn) of about 1500 to 25,154, (as measured by gel permeation chromatography (GPC) at 145° C),
3) a ratio of vinyl groups to total olefin groups according to the formula:

(vinyl groups/olefin groups)>(comonomer mole percentage+0.1)$^a$× 10$^a$×b, wherein a=−0.24 and b=0.8; or a=−0.20 and b=0.8; or a=−0.18 and b=0.83; or a=−0.15, b=0.83; or a=−0.10 and b=0.85,     4) a total number of vinyl groups per 1000 carbon atoms greater than or equal to 8000÷Mn (as determined by $^1$H-NMR at 125° C.), and     5) the Mw/Mn ranging from 2.083 to 5.666;

c) copolymerizing the polymer product with propylene and, optionally, one or more copolymerizable monomers, in a polymerization reactor under suitable polypropylene polymerization conditions using a chiral, stereorigid transition metal catalyst capable of producing isotactic polypropylene; and   d) recovering a branched olefin copolymer having a total comonomer content of from 0 to 20 mole percent; and a mass ratio of the isotactic polypropylene to the sidechains ranging from 99.9:0.1 to 50:50.

57. The process of claim 56 wherein step (a) is conducted by a solution process in which said ethylene and one or more copolymerizable monomers are contacted with a transition metal olefin polymerization catalyst activated by an alumoxane cocatalyst, the mole ratio of aluminum to transition metal is less than 220:1.

58. The process of claim 57 wherein step (c) is conducted in a separate reaction by solution, slurry, or gas phase polymerization.

59. The process of claim 58 wherein said chiral, stereorigid transition metal catalyst compound in step (c) is activated by an alumoxane cocatalyst or non-coordinating anion precursor.

60. The process of claim 58 wherein the chiral, stereorigid transition metal catalyst compound in step (c) comprises one or more of:

Dimethylsilandiylbis(2-methyl-4-phenyl-1-indenyl)ZrCl$_2$
Dimethylsilandiylbis(2-methyl-4,5-benzoindenyl)ZrCl$_2$;
Dimethylsilandiylbis(2-methyl-4,6-diisopropylindenyl)ZrCl$_2$;
Dimethylsilandiylbis(2-ethyl-4-phenyl-1-indenyl)ZrCl$_2$;
Dimethylsilandiylbis(2-ethyl-4-naphthyl-1-indenyl)ZrCl$_2$;
Phenyl(Methyl)silandiylbis(2-methyl-4-phenyl-1-indenyl)ZrCl$_2$,
Dimethylsilandiylbis(2-methyl-4-(1-naphthyl)-1-indenyl)ZrCl$_2$,
Dimethylsilandiylbis(2-methyl-4-(2-naphthyl)-1-indenyl)ZrCl$_2$,
Dimethylsilandiylbis(2-methyl-indenyl)ZrCl$_2$,
Dimethylsilandiylbis(2-methyl-4,5-diisopropyl-1-indenyl)ZrCl$_2$,
Dimethylsilandiylbis(2,4,6-trimethyl-1-indenyl)ZrCl$_2$,
Phenyl(Methyl)silandiylbis(2-methyl-4,6-diisopropyl-1-indenyl)ZrCl$_2$,
1,2-Ethandiylbis(2-methyl-4,6-diisopropyl-1-indenyl)ZrCl$_2$,
1,2-Butandiylbis(2-methyl-4,6-diisopropyl-1-indenyl)ZrCl$_2$,
Dimethylsilandiylbis(2-methyl-4-ethyl-1-indenyl)ZrCl$_2$,
Dimethylsilandiylbis(2-methyl-4-isopropyl-1-indenyl)ZrCl$_2$,
Dimethylsilandiylbis(2-methyl-4-t-butyl-1-indenyl)ZrCl$_2$,
Phenyl(Methyl)silandiylbis(2-methyl-4-isopropyl-1-indenyl)ZrCl$_2$,
Dimethylsilandiylbis(2-ethyl-4-methyl-1-indenyl)ZrCl$_2$,
Dimethylsilandiylbis(2,4-dimethyl-1-indenyl)ZrCl$_2$,
Dimethylsilandiylbis(2-methyl-4-ethyl-1-indenyl)ZrCl$_2$,
Dimethylsilandiylbis(2-methyl-α-acenaphth-1-indenyl)ZrCl$_2$,
Phenyl(Methyl)silandiylbis(2-methyl-4,5-benzo-1-indenyl)ZrCl$_2$,
Phenyl(Methyl)silandiylbis(2-methyl-4,5-(methylbenzo)-1-indenyl)ZrCl$_2$,
Phenyl(Methyl)silandiylbis(2-methyl-4,5-(tetramethylbenzo)-1-indenyl)ZrCl$_2$,
Phenyl(Methyl)silandiylbis(2-methyl-a-acenaphth-1-indenyl)ZrCl$_2$,
1,2-Ethandiylbis(2-methyl-4,5-benzo-1-indenyl)ZrCl$_2$,
1,2-Butandiylbis(2-methyl-4,5-benzo-1-indenyl)ZrCl$_2$,
Dimethylsilandiylbis(2-methyl-4,5-benzo-1-indenyl)ZrCl$_2$,
1,2-Ethandiylbis(2,4,7-trimethyl-1-indenyl)ZrCl$_2$,
Dimethylsilandiylbis(2-methyl-1-indenyl)ZrCl$_2$,
1,2-Ethandiylbis(2-methyl-1-indenyl)ZrCl$_2$,
Phenyl(Methyl)silandiylbis(2-methyl-1-indenyl)ZrCl$_2$,
Diphenylsilandiylbis(2-methyl-1-indenyl)ZrCl$_2$,
1,2-Butandiylbis(2-methyl-1-indenyl)ZrCl$_2$,
Dimethylsilandiylbis(2-ethyl-1-indenyl)ZrCl$_2$,
Dimethylsilandiylbis(2-methyl-5-isobutyl-1-indenyl)ZrCl$_2$,
Phenyl(Methyl)silandiylbis(2-methyl-5-isobutyl-1-indenyl)ZrCl$_2$,
Dimethylsilandiylbis(2-methyl-5-t-butyl-1-indenyl)ZrCl$_2$,
Dimethylsilandiylbis(2,5,6-trimethyl-1-indenyl)ZrCl$_2$.

61. The process of claim 58 wherein the chiral, stereorigid transition metal catalyst compound in step (c) comprises one or more of:

dimethylsilyl bis(2-methyl-indenyl)ZrCl$_2$,
dimethylsilyl bis(2-methyl-4-phenyl-1-indenyl)ZrCl$_2$,
dimethylsilyl bis(2-methyl-4-(1-naphthyl)-1-indenyl)ZrCl$_2$, or
dimethylsilyl bis(indenyl)hafnium dimethyl.

62. A process to produce a branched olefin copolymer having an isotactic polypropylene backbone, optionally comprising monomer units from one or more comonomers, and sidechains derived from macromers comprising:

a) contacting ethylene and at least one C$_3$ to C$_{12}$ olefin comonomer with a transition metal olefin polymerization catalyst activated by an alumoxane cocatalyst, the mole ratio of aluminum to transition metal is between 20:1 and 100:1, in a solution at a temperature of 30 to 150° C. and a pressure of up to 345 MPa;

b) obtaining a polymer product having:

1) greater than 40% chain end-group unsaturation,

2) a number average molecular weight (Mn) of about 1500 to 75,000, (as measured by gel permeation chromatography (GPC) at 145° C).

3) a ratio of vinyl groups to total olefin groups according to the formula:

(vinyl groups/olefin groups)>(comonomer mole percentage+0.1)$^a$× 10$^a$×b, wherein a=−0.24 and b=0.8; or a=−0.20 and b=0.8; or a=−0.18 and b=0.83; or a=−0.15, b=0.83; or a=−0.10 and b=0.85, 4) a total number of vinyl groups per 1000 carbon atoms greater than or equal to 8000÷Mn (as determined by $^1$H-NMR at 125° C.), and 5) an Mw/Mn ranging from 2.083 to 5.666;

c) copolymerizing the polymer product with propylene and, optionally, one or more copolymerizable monomers, in a polymerization reactor under suitable polypropylene polymerization conditions using a chiral, stereorigid transition metal catalyst capable of producing isotactic polypropylene; and d) recovering a branched olefin copolymer.

63. The process of claim 62 wherein step (a) is conducted by a solution process in which said ethylene and one or more copolymerizable monomers are contacted with a transition metal olefin polymerization catalyst activated by an alumoxane cocatalyst, the mole ratio of aluminum to transition metal is less than 220:1.

64. The process of claim 63 wherein step (c) is conducted in a separate reaction by solution, slurry, or gas phase polymerization.

65. The process of claim 64 wherein said chiral, stereorigid transition metal catalyst compound in step (c) is activated by an alumoxane cocatalyst or non-coordinating anion precursor.

66. The process of claim 65 wherein the chiral, stereorigid transition metal catalyst compound in step (c) comprises one or more of:

Dimethylsilandiylbis(2-methyl-4-phenyl-1-indenyl)ZrCl$_2$

Dimethylsilandiylbis(2-methyl-4,5-benzoindenyl)ZrCl$_2$;

Dimethylsilandiylbis(2-methyl-4,6-diisopropylindenyl)ZrCl$_2$;

Dimethylsilandiylbis(2-ethyl-4-phenyl-1-indenyl)ZrCl$_2$;

Dimethylsilandiylbis(2-ethyl-4-naphthyl-1-indenyl)ZrCl$_2$;

Phenyl(Methyl)silandiylbis(2-methyl-4-phenyl-1-indenyl)ZrCl$_2$,

Dimethylsilandiylbis(2-methyl-4-(1-naphthyl)-1-indenyl)ZrCl$_2$,

Dimethylsilandiylbis(2-methyl-4-(2-naphthyl)-1-indenyl)ZrCl$_2$,

Dimethylsilandiylbis(2-methyl-indenyl)ZrCl$_2$,

Dimethylsilandiylbis(2-methyl-4,5-diisopropyl-1-indenyl)ZrCl$_2$,

Dimethylsilandiylbis(2,4,6-trimethyl-1-indenyl)ZrCl$_2$,

Phenyl(Methyl)silandiylbis(2-methyl-4,6-diisopropyl-1-indenyl)ZrCl$_2$, 1,2-Ethandiylbis(2-methyl-4,6-diisopropyl-1-indenyl)ZrCl$_2$, 1,2-Butandiylbis(2-methyl-4,6-diisopropyl-1-indenyl)ZrCl$_2$, Dimethylsilandiylbis(2-methyl-4-ethyl-1-indenyl)ZrCl$_2$, Dimethylsilandiylbis(2-methyl-4-isopropyl-1-indenyl)ZrCl$_2$, Dimethylsilandiylbis(2-methyl-4-t-butyl-1-indenyl)ZrCl$_2$, Phenyl(Methyl)silandiylbis(2-methyl-4-isopropyl-1-indenyl)ZrCl$_2$, Dimethylsilandiylbis(2-ethyl-4-methyl-1-indenyl)ZrCl$_2$, Dimethylsilandiylbis(2,4-dimethyl-1-indenyl)ZrCl$_2$, Dimethylsilandiylbis(2-methyl-4-ethyl-1-indenyl)ZrCl$_2$, Dimethylsilandiylbis(2-methyl-α-acenaphth-1-indenyl)ZrCl$_2$, Phenyl(Methyl)silandiylbis(2-methyl-4,5-benzo-1-indenyl)ZrCl$_2$, Phenyl(Methyl)silandiylbis(2-methyl-4,5-(methylbenzo)-1-indenyl)ZrCl$_2$, Phenyl(Methyl)silandiylbis(2-methyl-4,5-(tetramethylbenzo)-1-indenyl)ZrCl$_2$, Phenyl(Methyl)silandiylbis(2-methyl-α-acenaphth-1-indenyl)ZrCl$_2$, 1,2-Ethandiylbis(2-methyl-4,5-benzo-1-indenyl)ZrCl$_2$, 1,2-Butandiylbis(2-methyl-4,5-benzo-1-indenyl)ZrCl$_2$, Dimethylsilandiylbis(2-methyl-4,5-benzo-1-indenyl)ZrCl$_2$, 1,2-Ethandiylbis(2,4,7-trimethyl-1-indenyl)ZrCl$_2$, Dimethylsilandiylbis(2-methyl-1-indenyl)ZrCl$_2$, 1,2-Ethandiylbis(2-methyl-1-indenyl)ZrCl$_2$, Phenyl(Methyl)silandiylbis(2-methyl-1-indenyl)ZrCl$_2$, Diphenylsilandiylbis(2-methyl-1-indenyl)ZrCl$_2$, 1,2-Butandiylbis(2-methyl-1-indenyl)ZrCl$_2$, Dimethylsilandiylbis(2-ethyl-1-indenyl)ZrCl$_2$, Dimethylsilandiylbis(2-methyl-5-isobutyl-1-indenyl)ZrCl$_2$, Phenyl(Methyl)silandiylbis(2-methyl-5-isobutyl-1-indenyl)ZrCl$_2$, Dimethylsilandiylbis(2-methyl-5-t-butyl-1-indenyl)ZrCl$_2$, Dimethylsilandiylbis(2,5,6-trimethyl-1-indenyl)ZrCl$_2$.

67. The process of claim 65 wherein the chiral, stereorigid transition metal catalyst compound in step (c) comprises one or more of:

dimethylsilyl bis(2-methyl-indenyl)ZrCl$_2$, dimethylsilyl bis(2-methyl-4-phenyl-indenyl)ZrCl$_2$, dimethylsilyl bis(2-methyl-4-(1-naphthyl)-indenyl)ZrCl$_2$, dimethylsilyl bis(indenyl)hafnium dimethyl.

* * * * *